United States Patent
Burger

[15] 3,667,081
[45] June 6, 1972

[54] WINDOW-CLEANING ARRANGEMENT
[72] Inventor: Karl-Heinz Burger, Buehl, Germany
[73] Assignee: Robert Bosch GmbH, Stuttgart, Germany
[22] Filed: Oct. 29, 1970
[21] Appl. No.: 85,146

[30] Foreign Application Priority Data
Nov. 3, 1969 Germany.....................P 19 55 127.0

[52] U.S. Cl......................................15/250.24, 15/250.29
[51] Int. Cl............................................................B60s 1/20
[58] Field of Search..........15/250.2, 250.24, 250.25, 250.26, 15/250.29, 250.34, 250.35

[56] References Cited

UNITED STATES PATENTS

| | | | |
|---|---|---|---|
| 1,665,570 | 4/1928 | Waters | 15/250.24 |
| 3,428,996 | 2/1969 | Carpenter | 15/250.29 X |
| 2,973,542 | 3/1961 | Horton | 15/250.35 X |

FOREIGN PATENTS OR APPLICATIONS

| | | | |
|---|---|---|---|
| 1,577,895 | 6/1969 | France | 15/250.24 |
| 880,556 | 6/1953 | Germany | 15/250.29 |

*Primary Examiner*—Peter Feldman
*Attorney*—Michael S. Striker

[57] ABSTRACT

An arrangement for cleaning light-emitting and light-admitting windows, particularly of motor vehicles. The window to be cleaned has a general plane, two transversely spaced first marginal portions and a second marginal portion which connects the first marginal portions. A carriage is mounted for movement along the second marginal portion between the first marginal portion and carries a wiper arm assembly which moves with it and which is pivotably mounted on it for turning movement about an axis paralleling the general plane of the window. A wiper blade is mounted on the assembly and extends in at least substantial parallelism with the first marginal portions but is offset laterally with respect to the axis. Biasing means biases the assembly pivotably about the axis to maintain the wiper blade in contact with the window.

10 Claims, 4 Drawing Figures

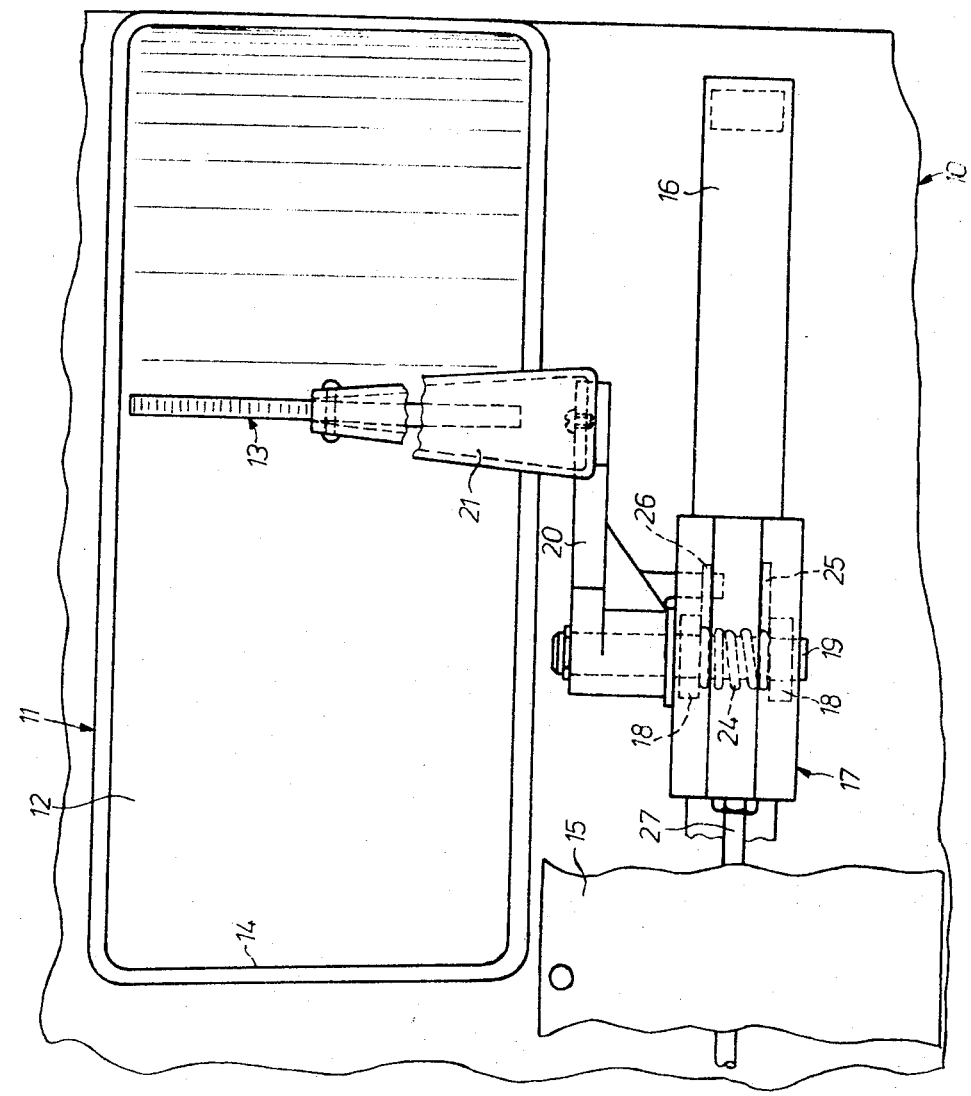
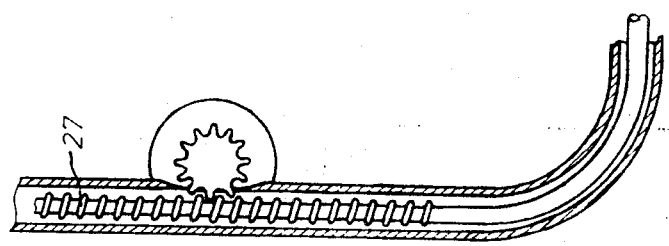
Fig. 2
INVENTOR
KARL-HEINZ BURGER
BY [signature]
ATTORNEY

WINDOW-CLEANING ARRANGEMENT

BACKGROUND OF THE INVENTION

The present invention relates generally to an arrangement for cleaning windows, and more particularly to an arrangement for cleaning light-admitted and light-emitting windows, especially those on motor vehicles.

The term "window" as employed herein is intended to have a broad meaning, and in particular it is intended to include windshields and any other light-admitting as well as light-emitting covers or elements on vehicles, such as the covers or lenses of vehicle headlights, vehicle taillights and the like. Consequently, although the invention will hereafter be described for the sake of explanation with reference to lenses or covers on vehicle taillights, it is to be understood that this is for explanatory purposes only and that the applicability of the invention is obviously broader than this limited exemplary field of application.

It is already known to provide wiper arrangements for vehicle headlights and vehicle taillights, that is for wiping the lenses thereof, to maintain them clean and to prevent a reduction in the amount of light admitted through them. Basically, these arrangements are adaptations of windshield wiper constructions wherein the arm is mounted for movement along one marginal portion of the windshield and is pivotable along an axis which extends in parallelism with the direction of movement. If such arrangements are to be used for wiping of headlight lenses, and particularly for wiping of lenses on taillights, a difficulty frequently arises where—especially in the lenses for vehicle taillights—portions of the lens are curved around laterally. In other words, the lens generally faces rearwardly of the vehicle if it is a taillight lens, but it is becoming more and more common in modern motor vehicle construction to have a portion of the taillight lens curve around laterally to the side of the vehicle so that the taillight is also visible from the side for safety reasons. Lenses which are curved in this manner cannot be properly cleaned with arrangements of the type just outlined because the guide means for the wiper arm which carries the wiper blade, and which guide means extends along one margin of the lens, would have to be strongly curved to follow the curvature of the lens. While this in itself presents no problem, the difficulty arises due to the fact that the carriage moving along the guide means and carrying the arm which in turn supports the wiper blade, could readily become jammed on a strongly curved guide track, especially because such a guide track is subject to heavy contamination with dirt and other contaminants which accumulate during movement of the vehicle.

On the other hand, other wiper constructions not possessed of such difficulties, that is not requiring a curved guide track following the curvature of the lens, have not been found satisfactory for such applications for various other reasons, and no satisfactory solution to this problem therefore has existed until now.

SUMMARY OF THE INVENTION

The present invention therefore has as its general object to provide an improved arrangement for cleaning windows and the like, with the term "window" being in its broad sense to include all light-emitting and all light-admitting covers on vehicle headlights and taillights, as well as windshields and the like.

More particularly the present invention has for its object to provide for an arrangement of the type under discussion which properly and without danger of malfunction will provide for reliable and at least substantially complete cleaning of such windows.

A concomitant object of the invention is to provide such an arrangement which is simple in its construction and therefore inexpensive to manufacture, to assemble and sell.

Still a further object of the invention is to provide such an arrangement which, due to its simplicity, is highly reliable and not subject to malfunctions.

In pursuance of the above objects, and others which will become apparent hereafter, one embodiment of the arrangement according to the present invention comprises, briefly stated, a window having a general plane, a pair of transversely spaced first marginal portions and a second marginal portion connecting the first marginal portions. Guide means extends along the second marginal portion and carrier means is movable along the guide means from one toward the other of the first marginal portions. Wiper arm means is carried by the carrier means for movement with the same and is pivotable with reference to the window about an axis extending in at least substantial parallelism with the general plane of the window. A wiper blade is mounted on the wiper arm means in at least substantial parallelism with the first marginal portions and is offset laterally from the aforementioned axis in direction towards the other of the first marginal portions. Biasing means biases the wiper arm means for pivotal movement about the aforementioned axis in a sense urging the wiper blade into contact with the window.

With this construction the wiper blade is capable of remaining in contact with, and affording proper cleaning of, even strongly curved portions of the window, because it can follow the curvature as the wiper arm means pivots under the influence of the biasing means when the wiper blade recedes on reaching and following the curvature, without the carrier means having to follow the curvature itself. This means that the guide means itself can be linear so that the difficulties resulting from a curved construction of the guide means are entirely avoided. It need, therefore, extend only along a part of the marginal portion which connects the lateral side margins of the window or lens, that is if a taillight lens of a vehicle is involved, it can extend along that portion of the transverse margin of the lens which faces rearwardly of the vehicle without having to curve around to that portion of the lens which faces laterally of the vehicle, while the wiper blade however is capable of reaching all the portions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a fragmentary detail view of one of the arrangements shown in FIG. 1, illustrated on an enlarged scale;

DESCRIPTION OF THE PREFERRED EMBODIMENTS

Figure 1:
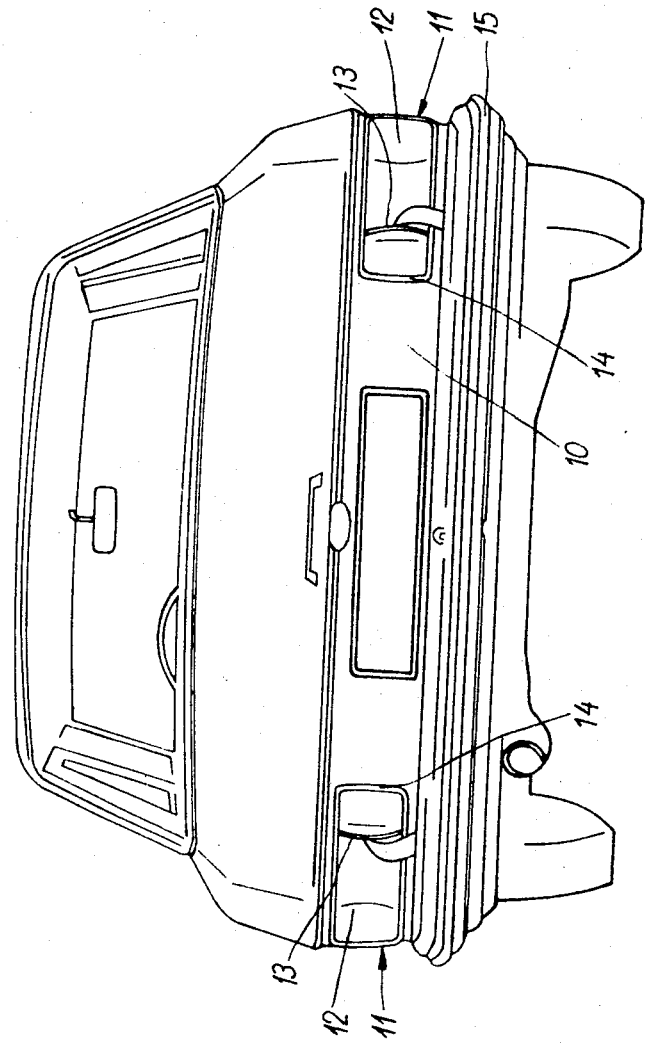
FIG. 1 is an end-elevational view of a motor vehicle having two taillight lenses each of which is provided with an arrangement according to the present invention.

Discussing now the drawing in detail, and firstly FIG. 1 thereof, it will be seen that the vehicle here is a motor vehicle which is shown in an end-elevational view. It is clear, however, that the invention would be applicable also to other types of vehicles, and could be used in applications of a non-vehicular nature. Also, while the invention is illustrated in this exemplary embodiment as used in conjunction with the lenses of the taillights of the vehicle, it could be employed also with the lenses of vehicle headlights, with a vehicle windshield or with the rear window of the vehicle, as long as the circumstances obtain which require the use of the arrangement, that is as long as whatever "window" to be cleaned with the arrangement has a portion which is strongly curved out of its general plane.

Returning to FIG. 1 it will be seen that reference numeral 10 identifies the rear end of the illustrated vehicle, and that reference numeral 11 in each case identifies one of the two taillights on the vehicle. Each of the taillight assemblies 11 is covered with a light-emitting cover, that is with a lens 12. Each of the assemblies 11 has associated with it a wiper arrangement the wiper blade 13 of which in the rest position is located at the lateral margin 14 of the lens 12 which faces towards the center of the vehicle, that is which faces inwardly as seen in FIG. 1. The opposite margins of the lenses 12, that is those laterally or transversely spaced from the margins 14, are curved out of the general plane of the respective lens 12 around to the side of the vehicle, that is substantially normal to the plane of FIG. 1 in direction towards the front end of the vehicle. The purpose of this construction is a safety consideration, namely to make the taillights visible at night at the side of the vehicle, to provide for a positive identification of the vehicle when seen from the side thereof.

Figure 3:
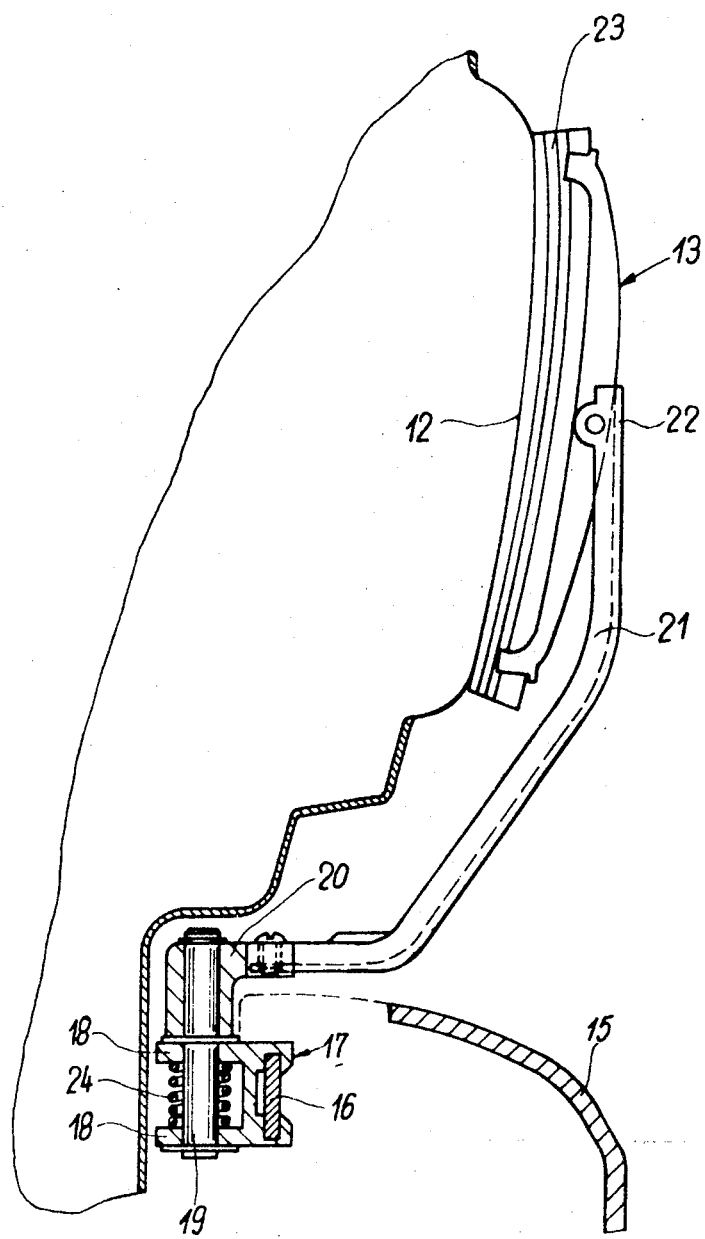
FIG. 3 is a section taken on line III—III of FIG. 2, illustrating the arrangement on approximately the scale which it would have for use with presently common taillight lenses.

FIGS. 2 and 3 show details of the construction of the wiper arrangements having the wiper blades 13. Arranged on a suitable body portion of the vehicle below the respective taillight assembly 11, and inwardly of the rear bumper 15, there is mounted a straight elongated guide rail 16 which extends in at least substantial parallelism with the marginal portion of the respective lens 12 which connects the inner margin 14 with its outer counterpart, but with to guide rail 16 extending along only that part of the marginal portion which faces rearwardly, that is the guide rail does not curve around to the side of the vehicle as does the lens 12 in part. Mounted on the respective guide rails 16 for longitudinal displacement relative thereto the carrier means 17 provided with two vertically spaced holding elements in form of eyes or the like, which in the direction towards the vehicle body as evident from FIG. 3. A bolt, rod, pin or the like 19 is pivotably mounted in the eye 18 for turning movement about an axis which at least substantially parallels the general plane of the respective lens 12. Mounted on the bolt 19 in turn, is a member 20 with which an arm 21 is fast; the member 20 and the arm 21 together constitute a wiper arm means for wiper arm assembly which is pivotable about the aforementioned axis, that is about the bolt 19.

As the drawing shows, particularly FIG. 3, the arm 21 is so formed that a wiper blade 23 which is held by a support 13 pivoted to the free end 22 of the arm 21, properly contacts the lens 12 when the arm consisting of the elements 20, 21 is pivoted about the axis defined by the bolt 19. Such pivoting is effected, and engagement of the blade 23 with the lens 12 at the necessary pressure is assured by the presence of biasing means, here illustrated in form of a so-called leg spring 24 which surrounds the bolt 19 intermediate the eyes 18 and one of whose legs 25 bears upon the carrier means 17 whereas the other leg 26 bears upon the element 20 and thus displaces the same together with the arm 21 and the blade 23, in direction towards the lens 12 so that the blade 23 constantly engages the lens 12 under pressure.

According to the present invention, and as most clearly seen in FIG. 2, the construction is such that the blade 23 carried by the holder 13 contacts the lens 12 intermediate the axis defined by the bolt 19 and the curved margin of the lens 14, that is the margin which is curved around to the side of the vehicle and which is transversely spaced from the inner margin 14. For the sake of clarity it should perhaps be pointed out that the larger-scaled detailed view in FIG. 2 is that of the arrangement provided on the right-hand taillight assembly 11 of FIG. 1. The blade 23 is thus laterally offset from the axis defined by the bolt 19 in the direction away from the margin 14 and towards that margin of the lens 12 which is curved around from the rear to the side of the vehicle.

A semi-rigid but flexible threaded cable 27 is connected with the carrier means 17 and a pinion gear or the like of a drive motor cams with the threads of the cable 27 to impart reciprocatory movement of the carrier means 17 longitudinally of the guide rail 16. However, it is clear from the drawing that the carrier means 17 will perform movements only over the length of the guide rails 16, that is only over that portion of the lens which faces rearwardly of the vehicle and that the carrier means will not move around the laterally curved portion of the lens 12. Because of the lateral offsetting of the blade 23 in the direction towards the curved portion of the lens 12, and because of the urging of the spring 24, the blade 23 will always remain in contact with the lens 12 and follow the surface of the same where it curves around to the side of the vehicle while the carriage or carrier means 17 itself always remains at the rearwardly directed part of the lens. Thus, when the blade 23 reaches the beginning of the curvature of the lens 12, where the latter curves around from the rear to the side of the vehicle, it recedes in direction towards the front of the vehicle as the blade 23 follows round the curvature, and it is forced to follow this curvature due to the fact that the spring 24 urges the arm 20, 21 pivotably about the axis defined by the bolt 19, in direction towards the lens 12. With such an arrangement the portion of the lens 12 which is curved around to the side of the vehicle is properly and reliably cleaned, and any difficulties due to jamming or other malfunctioning of the arrangement resulting from contamination of the guide means is avoided because the guide means does not have a curved portion and is thus not subject to the previously encountered difficulties, it being evident that the carriage or carrier means 17 will have a certain self-cleaning action which will remove contaminants from the guide rail 16 as long as the curvature where the contaminants are more readily able to prevent it from movement.

The arrangement of a flexible but semi-rigid threaded cable provides for a very simple motion transmission to the carrier means 17, and the drive motor for effecting the transmission of motion via the threaded cable is advantageously mounted in the boot or trunk of the vehicle. A single motor could be used with requisite transmission arrangements for driving both of the arrangements, that is for driving the arrangements associated with both of the taillight assemblies 11.

Figure 4:
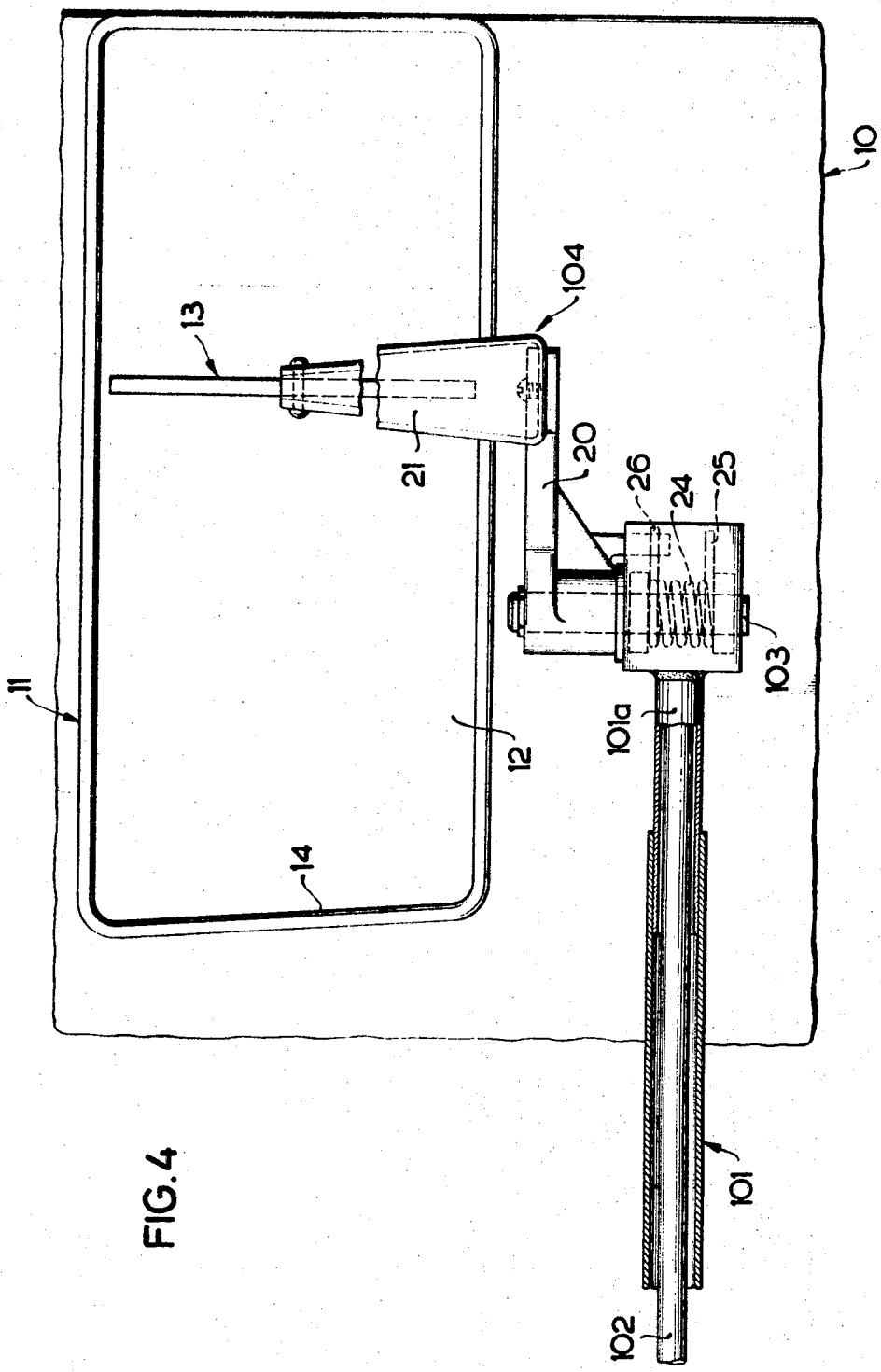
FIG. 4 is a view similar to FIG. 2 but of an additional embodiment.

For the sake of clarity it is pointed out that evidently this exemplary illustrated embodiment is not the only possibility, and that others will offer themselves to those skilled in the art. Thus, it is possible as shown in FIG. 4 to mount and guide the blade 23 on a telescopically constructed member 101, 101a with the motion-transmitting member 102 passing through the hollow interior of this member. In this case the pivot axis defined by the bolt 19, would be provided in direction normal to the axis of the pivotable rod-like structure, on the farthest extendable rod section 101a, and the entire telescopic structure would in effect constitute the carrier means whereas the cooperation of the sections 101, 101a would constitute the necessary guide. In other words, on the terminal telescopic section 101a there would be provided the pivot axis defined by the bolt 19, and at the end portion 104 of member 20 there would be provided arm 21 with the wiper blade 13, and to effect motion transmission for wiping purposes the element would alternately be telescoped and extended. The member 102 would be connected to that section which carries the wiper blade 23 in order to alternately effect telescoping and extending of the various sections.

It will be understood that each of the elements described above, or two or more together, may also find a useful application in other types of constructions differing from the types described above.

While the invention has been illustrated and described as embodied in an arrangement for cleaning windows, it is not intended to be limited to the details shown since various modifications and structural changes without departing from the spirit of the present invention.

Without further analysis, the foregoing will so fully reveal the gist of the present invention that others can by applying current knowledge readily adapt it for various applications without omitting features that, from the standpoint of prior art, fairly constitute essential features of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. Arrangement for cleaning windows and the like, particularly for light-emitting covers on vehicle lights and taillights, comprising a window having a general plane, a pair of transversely spaced first marginal portions and a second marginal portion connecting said first marginal portions; guide means extending along said second marginal portion; carrier means movable along said guide means from one toward the other of said first marginal portions; wiper arm means carried by said carrier means for movement with the same and being pivotable with reference to said window about an axis extending in at least substantial parallelism with said general plane; a wiper blade mounted on said wiper arm means in at least substantial parallelism with said first marginal portions and offset laterally from said axis in direction towards said other of said first marginal portions; and biasing means biasing said wiper arm means for pivotal movement about said axis in a sense urging said wiper blade into contact with said window.

2. Arrangement as defined in claim 1, said biasing means comprising a spring having a first part bearing against said carrier means and a second part bearing against said wiper arm means.

3. Arrangement as defined in claim 1, said general plane being curved in direction away from said pivot axis at least in the region of said other first marginal portion.

4. Arrangement as defined in claim 1, said carrier means comprising pivot means defining said pivot axis, and said wiper arm means being mounted on said pivot means turnable about said pivot axis; and wherein said biasing means comprises a biasing spring having a convoluted portion surrounding said pivot means, a first arm bearing upon said carrier means, and a second arm bearing upon said wiper arm means.

5. Arrangement as defined in claim 1, said wiper arm means comprising a first arm portion having one end region mounted for pivotal movement about said axis and an other end region, and a second arm portion carried by said other end region of said first arm portion and having a free end; and wherein said wiper blade is mounted on said free end.

6. Arrangement as defined in claim 5, said arm portions together constituting a one-armed lever.

7. Arrangement as defined in claim 1; further comprising drive means for moving said carrier means along said guide means between said marginal portions.

8. Arrangement as defined in claim 7, said drive means comprising a flexible semi-rigid cable connected with said carrier means and having a portion remote from the same, at least said portion being externally threaded, and drive gear means camming with the threads on said portion.

9. Arrangement as defined in claim 1, said carriage means comprising a plurality of telescopic rod sections having a common axis which extends longitudinally of said guide means and including one terminal section mounted for pivotal movement about said axis, and an other terminal section constituting said wiper arm means.

10. Arrangement as defined in claim 9; and further comprising drive means for alternately extending and retracting said telescopic sections along said common axis.

* * * * *